United States Patent
Buhe et al.

(10) Patent No.: US 8,332,058 B2
(45) Date of Patent: Dec. 11, 2012

(54) DIGITAL MICROPHONE

(75) Inventors: Gerrit Buhe, Wedemark (DE); Axel Haupt, Langenhagen (DE); Frank Plath, Wedemark (DE); Jan Watermann, Hannover (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 1839 days.

(21) Appl. No.: 10/585,217

(22) PCT Filed: Dec. 30, 2004

(86) PCT No.: PCT/EP2004/014833
§ 371 (c)(1),
(2), (4) Date: Jun. 30, 2006

(87) PCT Pub. No.: WO2005/064828
PCT Pub. Date: Jul. 14, 2005

(65) Prior Publication Data
US 2007/0168819 A1    Jul. 19, 2007

(30) Foreign Application Priority Data
Dec. 30, 2003 (DE) .................................. 103 61 817

(51) Int. Cl.
*G06F 17/00* (2006.01)
*H04H 40/00* (2008.01)

(52) U.S. Cl. ........................................ 700/94; 455/3.06
(58) Field of Classification Search .................... 700/94; 455/3.06; 370/335, 342, 529, 487; 375/347
See application file for complete search history.

(56) References Cited

U.S. PATENT DOCUMENTS

| | | | |
|---|---|---|---|
| 4,829,523 A | 5/1989 | Bretl | |
| 4,882,773 A | 11/1989 | Maloney | |
| 5,751,739 A | 5/1998 | Seshadri et al. | |
| 6,170,073 B1 | 1/2001 | Jarvinen et al. | |
| 6,781,977 B1 * | 8/2004 | Li | 370/335 |
| 2001/0050926 A1 * | 12/2001 | Kumar | 370/529 |
| 2001/0055984 A1 | 12/2001 | Kawasaki et al. | |

FOREIGN PATENT DOCUMENTS

| | | |
|---|---|---|
| CN | 1277761 | 12/2000 |
| EP | 0732816 | 9/1996 |
| EP | 0 798 888 | 10/1997 |

(Continued)

OTHER PUBLICATIONS

Patent Abstracts of Japan, Publication No. 61095627 published May 14, 1986 Appln No. 59216711 filed Oct. 16, 1984 (Wireless Microphone / Matsushita Electric Ind Co., Ltd).

*Primary Examiner* — Andrew C Flanders
(74) *Attorney, Agent, or Firm* — Frommer Lawrence & Haug

(57) ABSTRACT

The invention relates to a process for the transmission of digitized audio information of high quality and with a short delay, in particular processes for the transmission of digitized audio information in an audio pickup (microphone) and/or playback path. According to the invention there is proposed a channel filter which is used to shape the high frequency spectrum of the transmission, wherein the spectrum has no attenuation in a first range of about 100 to 300 kHz useful bandwidth and in a range outside the first range it has a stop-band attenuation of particularly preferably more than 60 dB or more than 80 dB.

64 Claims, 8 Drawing Sheets

FOREIGN PATENT DOCUMENTS

| | | |
|---|---|---|
| EP | 0 905 912 | 3/1999 |
| EP | 1 113 582 | 7/2001 |
| EP | 1 372 304 | 12/2003 |
| GB | 2 249 928 | 5/1992 |
| JP | 8265233 | 10/1996 |
| JP | 11088748 | 3/1999 |
| JP | 2002-171191 | 6/2002 |
| JP | 2002-176380 | 6/2002 |
| JP | 2003-518812 | 6/2003 |
| JP | 2003-298481 | 10/2003 |
| WO | 99/12281 | 11/1999 |
| WO | WO 01/47146 | 6/2001 |
| WO | WO 02/43259 | 5/2002 |
| WO | 03/069918 | 8/2003 |

\* cited by examiner

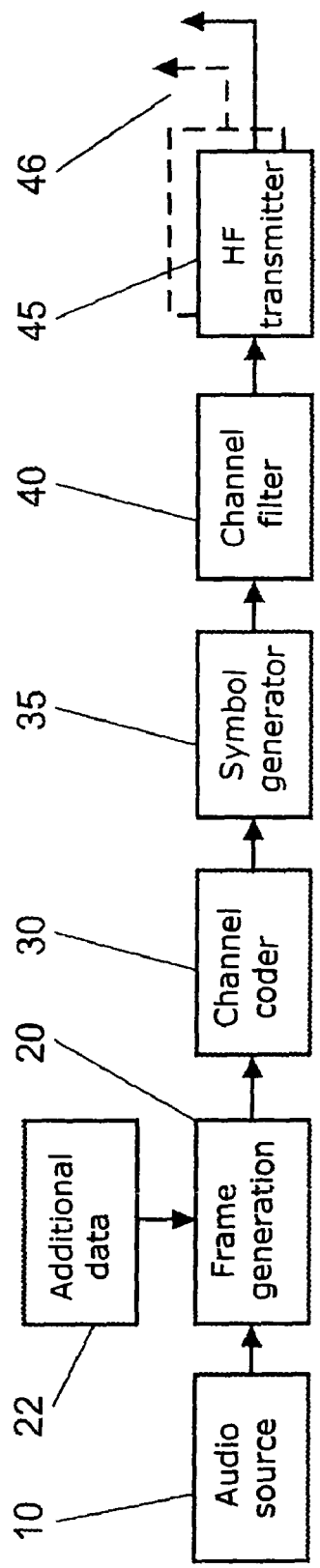
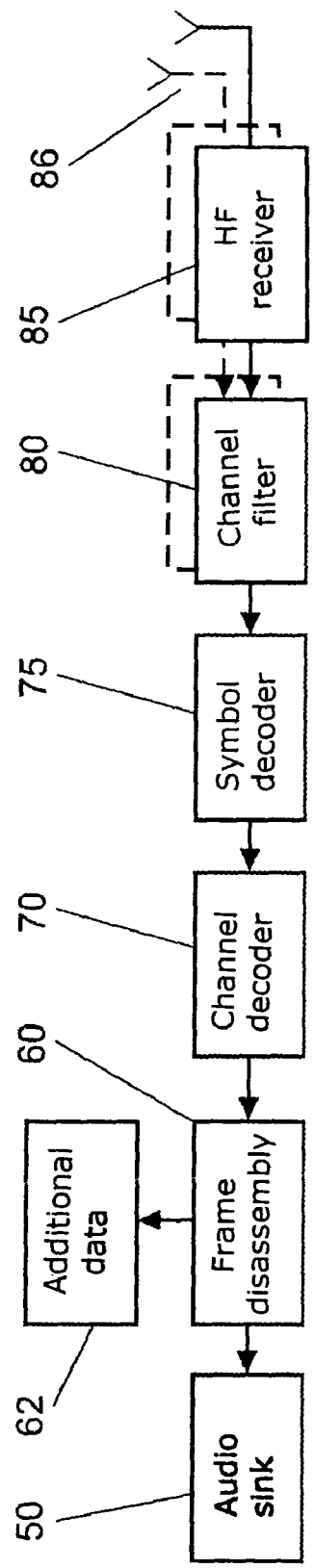
Fig.1
Fig.2

DIGITAL MICROPHONE

CROSS-REFERENCE TO RELATED APPLICATIONS

This application claims priority of International Application No. PCT/EP2004/014833, filed Dec. 30, 2004 and German Application No. 103 61 817.1, filed Dec. 30, 2003, the complete disclosures of which are hereby incorporated by reference.

BACKGROUND OF THE INVENTION a) Field of the Invention

The present invention preferably concerns a microphone, in particular a digital microphone, that is to say a microphone in which the signal which comes from the microphone transducer is already digitized in the microphone and the corresponding microphone signal is delivered digitally by the microphone, either by way of a cable or wirelessly, for example in a microphone receiver, pre-amplifier etc.

b) Problems Addressed by the Invention

High-quality audio data produce large amounts of data after A/D conversion. If, as is usual for example in studio technology, the procedure involves sampling an audio signal at 48 kHz with a word width of for example 16 bits, the result is a data stream of 768000 bit/s per channel, which in the case of a stereo channel already signifies more than 1.5 Mbit/s.

In order to protect the data generated in that way from transmission errors, redundancy is added in the form of additional bits which are used at the receiving end for error recognition and error correction. As a result the amount of data to be transmitted is considerably increased once again, depending on the respectively desired correction capacity.

In order to reduce the amount of data to be transmitted audio data compression processes, for example in accordance with the MPEG standard, are frequently used. They reduce the redundancy contained in the audio signal insofar as they process longer blocks of audio data in accordance with various processes. With an increasing block size the compression rate which can be achieved increases and thus the amount of data falls. Processes which suffer with losses and loss-less processes are known, the former achieving a higher compression rate.

That block formation results in the generation of a delay in the transmission system as a data block can only be processed when it has completely arrived. That applies both in regard to the transmitting and also the receiving end. That effect is unwanted in some uses, in particular in relation to studio applications in which microphones of the present kind are to be particularly used.

If the transmission path is at the beginning of an audio production chain, the reduction in redundancy in the audio signal is disadvantageous. Subsequent production steps could influence the audio signal in such a way that the quality thereof suffers markedly. In addition the free creative options of sound mixers would be restricted. Compression processes are therefore unwanted in high-quality transmission situations, that is to say for example in the studio, on the path from the microphone to the pre-amplifier, mixer, recording unit etc.

Compressed audio signals are more sensitive to transmission errors. Disturbing a few bits within a compressed data block can render the entire block useless. Therefore enhanced precautions are to be taken for error correction, whereby the amount of data to be transmitted increases again. With certain error scenarios, the reduction in the amount of data can be completely nullified by the necessary error protection and even made into just the opposite.

The above-described aspects cause the use of audio data compression procedures to be fundamentally problematical so that as far as possible the use thereof should be entirely abandoned, at least in terms of recording audio in a studio.

Present day systems for digital wireless radio transmission of audio data which must manage without compression processes or only with low compression factors operate in frequency ranges which admit high occupied bandwidths. The ISM bands at 900 MHz and 2400 MHz are popular. There the bandwidth occupied can be several MHz. It will be noted however that those frequency ranges are also used by many other radio systems. Prioritisation of given uses is not possible by virtue of authorisation regulations in those frequency ranges. The transmission of audio data from microphones to the receiver is accordingly in danger of being disturbed in an unwanted fashion at any time because other transmitters are possibly transmitting in the proximity, on the same frequency band.

Frequency ranges outside the ISM bands without general clearance are available for professional uses. Transmission would be possible there, without involving interference. It will be noted that historically, due to analog radio transmission, authorisation regulations which require low occupied bandwidths apply to those frequency ranges. Thus for example an occupied bandwidth of a maximum of 200 kHz is prescribed for radio microphones in the UHF range (in Europe).

High-quality and thus high data-rate digital transmission systems with slight transmission delay in such narrow bandwidths are however not available.

OBJECT AND SUMMARY OF THE INVENTION

Accordingly the primary object of the invention is to develop a digital transmission process as such, but in particular for microphones or radio paths, with which high data streams of audio data can be transmitted, audio data compression processes do not necessarily have to be used, an adequate transmission rate is afforded even for error correction processes, which has a very low delay, and allows a battery mode of operation both for transmitters and also for receivers, and which has a low occupied bandwidth in the radio channel.

According to the invention those aims are achieved by a transmission process having the features set forth in the independent claims and by a microphone system/radio path for carrying out the transmission process. Advantageous developments are disclosed in the appendant claims and the description and also in the drawings.

A particular property of the transmission process according to the invention and the microphone according to the invention is that transmission is possible at a high data rate with at the same time a small bandwidth in real time. Thus for example with about 2 to 8 bit/symbol, preferably 4 bit/symbol, it is possible to provide a high-quality transmission of the audio signals of the microphone. In that respect it is not just wireless audio microphone transmission that is in the foreground, but also wired audio microphone transmission.

The particular advantages and the essence of the invention are described in greater detail in the description hereinafter.

BRIEF DESCRIPTION OF THE DRAWINGS

In that respect in the drawings:

FIG. 1 shows components of a transmitting device;

FIG. 2 shows components of a receiving device;

DESCRIPTION OF THE PREFERRED EMBODIMENTS

Figure 3:
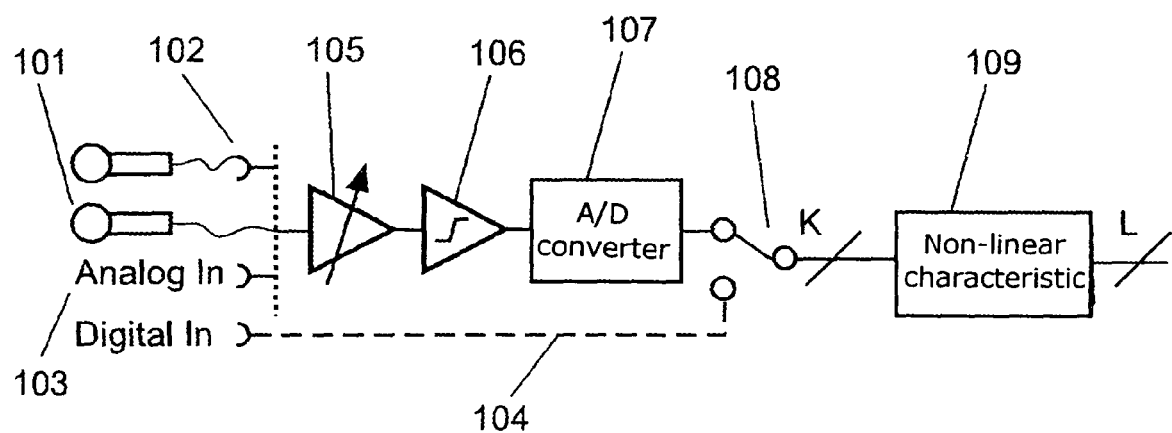
FIG. 3 shows a block circuit diagram of the audio source.

In a transmitting device as shown in FIG. 1 an audio source 10 delivers a digital data stream which is due for data transmission. That audio source can include a non-linear characteristic which implements re-encoding of the signal for shorter word lengths.

At regular spacings the frame generation means 20 introduces additional data 22 into the data stream. They serve for synchronisation of the data stream at the receiver end and/or for the transmission of status data of the transmitter and/or for transmission of a check sum or other data for controlling or monitoring the transmitter or the receiver respectively. The frame generation means is capable of outputting a data stream which is sorted in accordance with relevance of the data. In that way bits of high significance and bits of low significance can be sorted at given positions in the frame.

In the channel coder 30 redundancy is added to the useful data for error correction at the receiver end. For that purpose the incoming data are grouped in short packets of the length N. Code words of the length M>N are formed therefrom. The packets of the length N contain data of various relevance stages which can be supplied to autonomous error correction systems. The relevance stages thus remain in the packets of the length M.

A subsequent signal generator 35 forms a complex modulation symbol from a code word. In that respect it makes use of a symbol supply of the amount $2^M$. The individual modulation symbols differ in that respect in terms of amplitude and/or phase. Each symbol represents M bits of the data stream involving redundancy. The various relevance stages can in that case be attributed to corresponding bit positions within the symbol. Data with a high relevance are associated with more secure positions and vice-versa.

Alternatively the symbol generator can be so designed that in each case the difference in relation to the preceding code word is converted to afford a modulation symbol.

A subsequent channel filter 40 limits the spectrum of the symbol stream and thus forms the transmission spectrum.

In an HF transmitter 45 the filtered symbol data stream is converted into an analog signal and modulated on to an HF carrier, amplified and radiated by way of an antenna arrangement 46. In that respect it is possible to use individual antennae as well as antenna arrangements comprising a plurality of segments which automatically preferably actuate that segment which involves optimum emission.

In a receiving device corresponding to FIG. 2 a single-channel or multi-channel antenna arrangement 86 receives the HF signal.

It is amplified in a single-channel or multi-channel HF receiver 85, subjected to coarse pre-filtering, separated from the HF carrier, and converted into a digital data signal. Analog/digital conversion is effected in each case in a converter device which is operated with an autonomous and fixed clock which is asynchronous with respect to the transmitter. That minimises clock jitter. Subsequent digital signal processing also operates in each case in parts asynchronously with respect to the transmitter and is finally only synchronised in the audio sink 50.

A single-channel or multi-channel channel filter 80 selects the transmission spectrum and respectively reconstructs the transmitted symbol stream.

A symbol decoder 75 reconstructs, from one or more symbol streams, the complex modulation symbols comprising the symbol supply $2^M$. For combining a plurality of symbol streams, it is possible to have recourse to items of side information from the respective reception levels, the respective spacings of the symbol from the ideal position and/or the distortions of the transmission channel.

The code words of the length M which are ascertained in that way are checked for errors in the channel decoder 70 and possibly corrected. The redundancy added in the transmitter is removed and the packets of the length N assembled to afford an overall frame.

In a frame disassembler 60 the additional data 62 added at the transmission end are separated off, possibly evaluated and the transmitted audio data stream outputted. The bits previously sorted on the basis of relevance are brought back into their original position.

An audio sink 50 contains a process for the detection and concealing of residual errors, which contains no items of secondary information from the data stream. Only a check sum tests the data stream for the existence of residual errors. The correction values ascertained by that process are only used when a received frame has certainly been recognised as erroneous.

Some of the described components, their function and/or their combination are already known from various technical areas.

The object already described above is however attained in accordance with the invention in that in part new ways of attaining the object are pursued for the components, the required parameters being so selected that highly advantageous solutions are afforded or new functionalities are incorporated, which are particularly advantageous for the use envisaged here.

An audio source, specifically for the transmission of digital audio data, is shown in FIG. 3. The function thereof is to provide the digital data stream to be transmitted.

The arrangement therefore includes means for receiving an analog input signal and a digitization device. For feeding the analog input signals, the arrangement includes either a plug connection 102 for a microphone and/or a directly connected microphone 101 and/or a general analog high-level input 103.

The input signal is adapted by way of an adjustable amplifier 105 to the actuating range of an A/D converter 107. A limiting device 106 is provided for preventing overdriving.

The A/D converter delivers sampling values of the width K. In studio technology that is generally 24 bits.

A downstream-connected non-linear characteristic 109 reduces the word width of the sampling value to the width L. In that situation a worsening of the signal/noise ratio is deliberately accepted.

It will be noted that the segment characteristics known from the field of telecommunications are unsuitable here. Segmentation thereof results in a stepped change in the signal/noise ratio. That is audible in the standards of studio technology and is therefore to be avoided.

Figure 4:
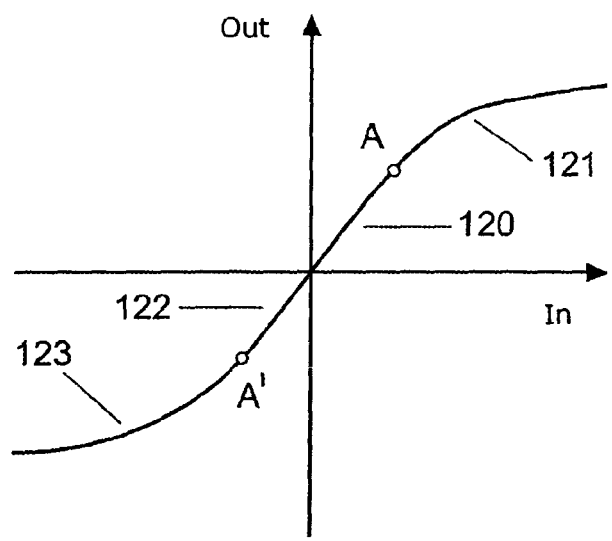
FIG. 4 shows a special non-linear characteristic.

A characteristic in accordance with the invention as shown in FIG. 4 avoids the above-described disadvantages.

A linear relationship between input and output signal is provided for small input signals 120. For larger input signals 121, there is a non-linear relationship between input and output signal. That could be for example a logarithmic relationship. At the intersection A between the segments 120 and 121 a segment 121 is so calculated that it blends into the segment 120 continuously, that is to say without a kink. With respect to the intersection A the segment 120 forms the tangent to the segment 121.

The properties of the characteristic can be varied within wide limits by virtue of the choice of the intersection A, the gradient of the segment 120 and the curvature of the segment 121. The segments 122 and 123 with the intersection A' correspondingly apply in symmetrical relationship for negative input values, as shown in FIG. 4.

It is further possible for the segment 121 or 123 respectively to be subdivided into subsegments of differing curvature, wherein the curvatures are to be so selected that a steady transition is guaranteed.

Alternatively the word width can be reduced by cutting off the less significant bits, in which case preferably a dithering algorithm is used for white noise formation.

In addition or alternatively the audio source can have a digital input 104. In that case the signal which is already digital is passed directly to the non-linear characteristic 109. A change-over switch 108 is possibly necessary in order to switch over between different inputs, whether of analog or digital nature.

In regard to parameter design of the frame generating means, the channel coder and the symbol generator, the arrangement fundamentally involves freedom in terms of the choice of the frame length, the number of redundant bits for error correction and the number of bits which are to be transmitted per symbol.

An essential limitation here is the low bandwidth in HF transmission. Therefore the number of bits which have to be transmitted must be kept as low as possible. It is therefore not possible to add a large amount of redundant bits. In addition it is necessary to transmit a plurality of bits per symbol. The number of bits which are necessary to organise or synchronise the data stream at the receiver end also has a marked influence.

A further limitation is the admissible delay time. Long frame lengths can require large input and output buffers at the transmitting and receiving ends, thereby increasing the delay time. The same applies to channel codes of great block length.

In order to be able to transmit the required amount of data with a less occupied bandwidth, M bits are transmitted simultaneously in a modulation symbol.

In accordance with the invention in dependence thereon a channel coder 30 is so selected that, starting from data blocks of the length N, it produces output words of the same length M as the modulation symbol.

In addition the frame length is selected as an integral multiple of the word length L of the sampling values and at the same time as an integral multiple of the length N.

If additional data, for example for synchronisation, are required in the frame, they are to be embedded in the frame, with the omission of sampling values.

The complication and expenditure for data synchronisation is minimised by parameter design in accordance with the above-indicated rules. The channel code words are automatically synchronised by the modulation symbol. A short bit pattern suffices for synchronisation of the entire frame. As the entire frame passes through a channel coder all bits are protected against transmission errors, including all additional bits. The number of additional bits necessary is minimised.

Alternatively some bits can be excluded from that protection if they are viewed as being less relevant or less worthy of protection.

A particularly advantageous characteristic is afforded if the number of bits per modulation symbol is selected as an integral multiple of the output word width of the channel coder.

The foregoing rules also apply if the basis considered is not just a frame but a plurality of frames combined to afford a group, and if that group is then viewed as a frame in the above-indicated sense.

Usually, in a digital receiver for audio signals, all components are operated with a clock which is derived from a common master clock by division. That also includes in particular the clock for the A/D converter device which digitises the analog signals arriving from the HF portion. That master clock is so adjusted by a clock recovery circuit that it is exactly tuned to the transmission signal.

That arrangement always involves a certain clock jitter which upon A/D conversion leads to a sub-optimal result.

Figure 5:
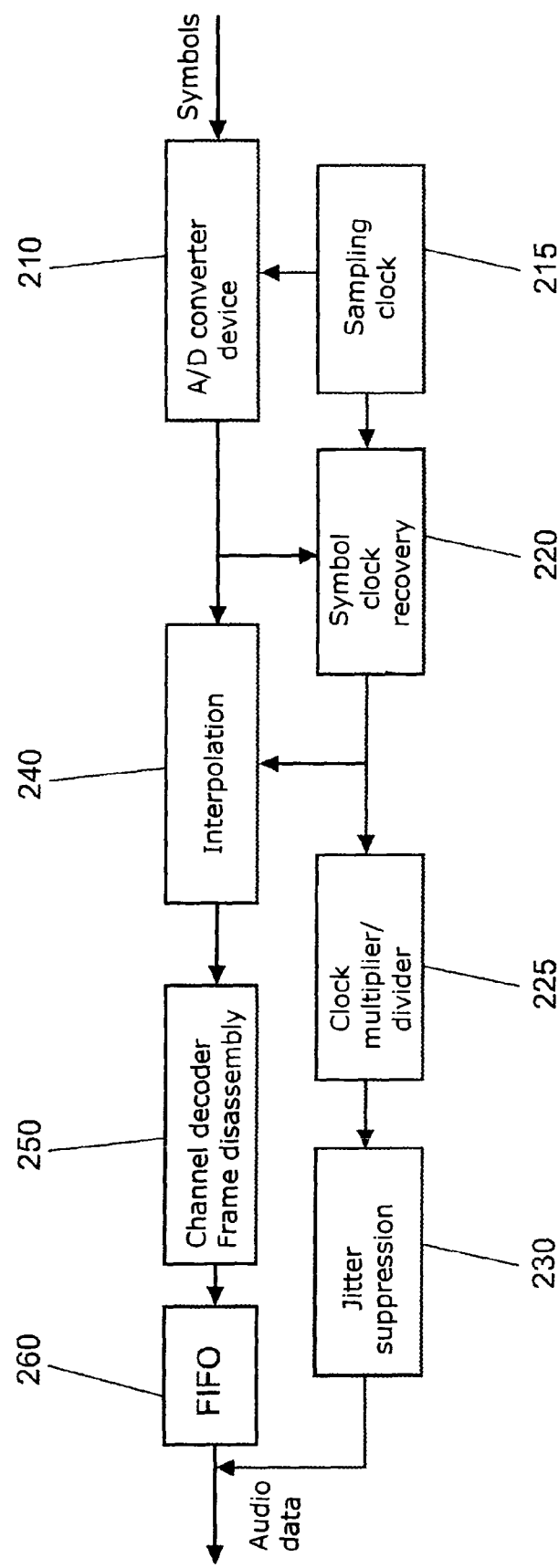
FIG. 5 shows the asynchronous clocking of an A/D converter device.
Figure 6:
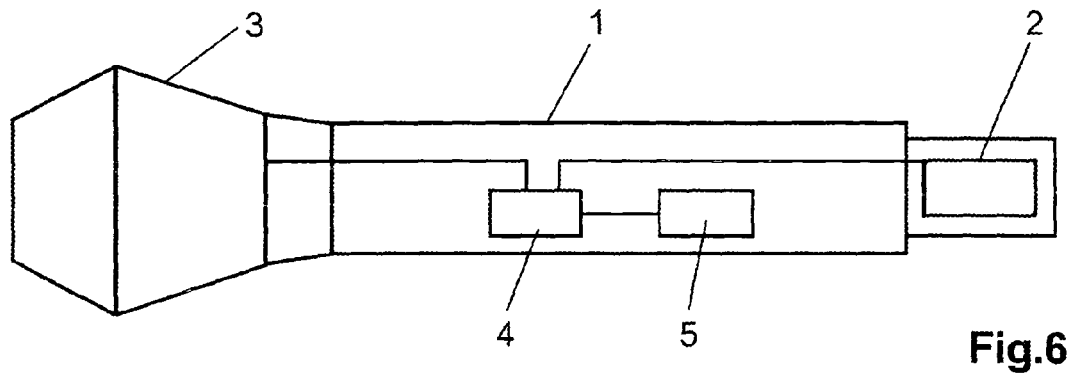
FIGS. 6-9 illustrate, in schematic representation, radio transmitting microphones having touch-sensitive antenna diversity.
Figure 7:
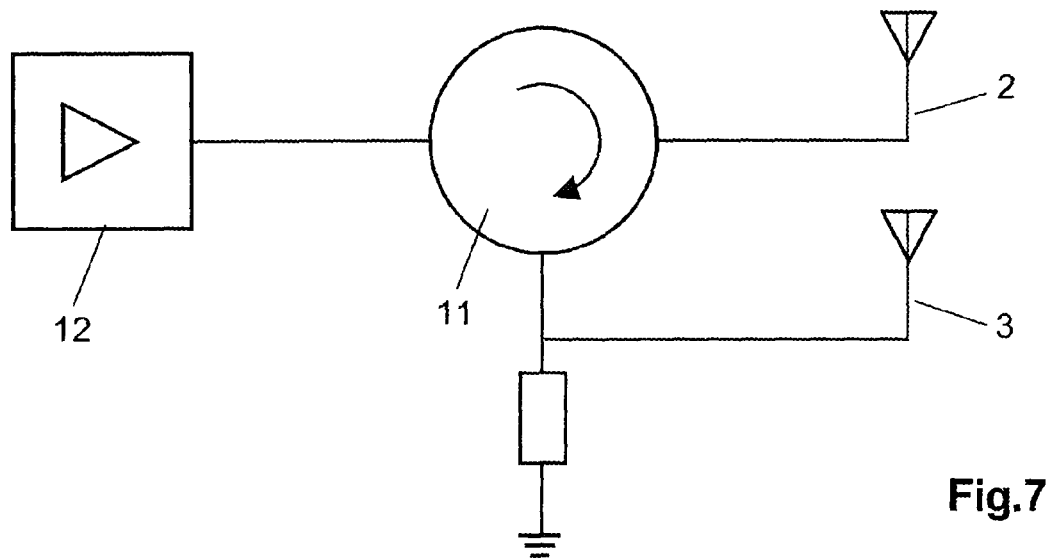
Figure 8:
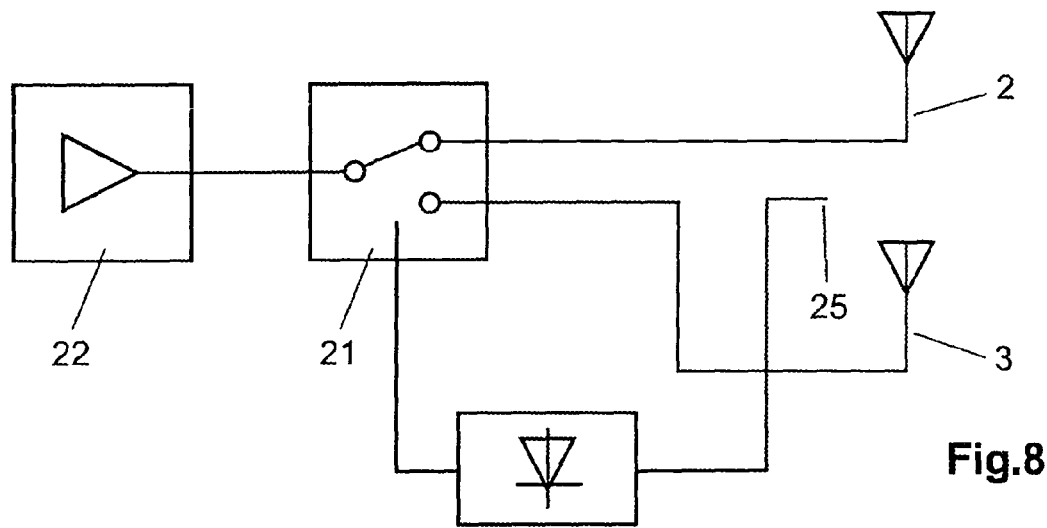
Figure 9:
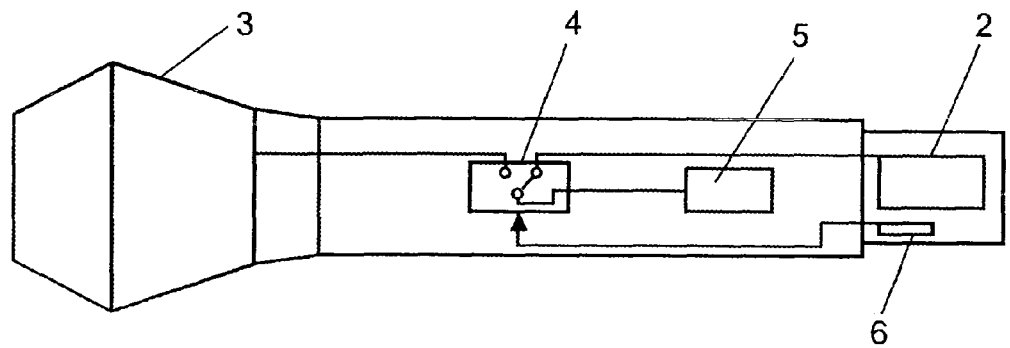

In accordance with the invention that above-indicated disadvantage is avoided by the arrangement shown in FIG. 5.

The incoming analog signals which represent a filtered symbol data stream are applied to an A/D converter device 210.

The sampling clock 215 operates independently of all the remaining clocking of the system. It is fixedly set to a frequency which is a multiple of the necessary baseband sampling rate. The digitized symbols pass into an interpolation device 240 and a symbol clock recovery device 220.

The symbol clock recovery means, on the basis of the digitized symbol stream, calculates the true symbol and also passes it to the interpolation device 240.

In the interpolation device 240 the symbols are sampled again at the true symbol rate and thus reduced to the true symbol rate.

The symbols obtained in that way then pass through the further receiver circuit 250, namely the channel decoder and the frame disassembling means and then pass into a short FIFO memory 260. The read-out clock for the FIFO memory is based on the true symbol clock which is obtained by the clock multiplier and/or clock divider 225 and a jitter suppression means 230.

Supplemental to or alternatively to the above-described transmission process the present application also concerns a touch-sensitive antenna diversity for a radio transmission microphone. That antenna diversity can be constructed together with a digital microphone (as described hereinbefore) or also can be independent thereof. Such a radio microphone with connected antenna emits a modulated HF signal.

If then the aim is to increase the transmission reliability of the transmitted HF signal and thus to achieve a high-quality signal transmission, it must be pointed out in this context that an antenna diversity is usual in the case of microphone receivers in order to minimise field strength collapses caused by multipath propagation.

Usually radio microphones comprise a microphone, a housing with an internally disposed transmitter unit and a transmitting antenna. Those functional units are usually so assembled that the precise position of the transmitting antenna is not necessarily recognisable. By virtue thereof it is usual that a hand-held microphone is not only held at its housing but also at the antenna or at the microphone cage.

Gripping the microphone at the transmitting antenna means that the antenna is shadowed and the base impedance thereof is altered. At the same time the hand will absorb a not inconsiderable part of the transmission energy. Those effects considerably reduce the transmission power emitted and lead to a marked reduction in range.

It is here that the invention now proposes equipping a microphone hand transmitter with two antennae which are connected selectively or weightedly to the transmitter unit. Those antenna are disposed at different positions on the microphone, which are as far away from each other as possible, for example on the microphone cage on the one hand and at the end of the microphone handle on the other hand. For that purpose the antennae must be electrically insulated from the microphone housing and galvanically or capacitively connected to a change-over switching unit. That change-over switching unit which is disposed between the transmitter and the antenna can comprise an HF switch or a circulator which is connected to the diversity antennae.

When using a change-over switch the switching criterion in the detector is obtained from the reflected power detected in the line coupler. Complete shadowing of both diversity antennae at the same time is highly improbable due to the large spacing between the two antennae. If nonetheless that situation occurs, it can be assumed that one of the two antennae, due to the larger geometrical dimensions thereof, can be less screened than the other antenna.

The switching criterion can also be taken from a contact sensor which evaluates a change in resistance of the sensor relative to the housing or a hum voltage increase in the sensor and triggers the switching operation.

The above-described solution, which is also to be used on its own, of the touch-sensitive antenna diversity for radio transmitting microphones is shown in further FIGS. 6, 7, 8 and 9. In those Figures the individual references denote as follows:
- 1—microphone
- 2—diversity antenna at the rear end of the microphone
- 3—diversity antenna at the front end (cage)
- 4—change-over switching unit
- 5—transmitter
- 6—housing sensor for changes in resistance or hum voltage
- 11—circulator
- 12—amplifier
- 21—HF switch
- 22—amplifier
- 25—line coupler
- 26—detector.

Additionally to but also separately from the above-described transmission processes or described microphone it is also possible to use a process for relevance-adapted error protection coding of digital audio data in order thereby to improve the overall quality of audio data transmission.

It can be used in relation to digital wireless transmission systems (but also elsewhere) which include a combination of a high-value digital modulation process with transmission data of different relevance stages. As an example 16 bit PCM-coded audio data also have 16 relevance stages. In the case of digital modulation with 4 bits per symbol, depending on the respective association of the bits with the modulation system, there are now also up to 4 quality stages of differing bit error rates. The PCM bits with the highest information content are now associated with the symbol bits of high quality, and vice-versa.

The relevance-adapted error protection coding process is based on the utilization of differences inherent in the system in the uncorrected bit error rate between the individual output bit positions of higher-value digital modulation modes. By virtue of association of those different quality stages with autonomous error correction systems, those differences are retained and thus permit relevance-adapted distribution of the useful data. Higher quality stages with a lower bit error rate receive the data with the highest information content while data with a lower information content are distributed to lower quality stages.

The advantages over an individual error correction system are afforded firstly by a markedly improved aural impression with the same channel bit error rate. That effect is afforded with a clever choice of the parameters although the bit error rate after correction under some circumstances even turns out to be higher than in the case of an individual error correction system. A further effect is afforded in automatic and continuous adaptation of the final quality to the channel properties. In contrast to an abrupt interruption in the connection, there is firstly a continuous deterioration in quality ('graceful degradation'). The aural perception shifts from a sudden 'crash' to a continuous rise in background noise, which the hearer perceives as being substantially more pleasant. The relationship between higher noise with a poor radio connection rather corresponds to the previous accustomed hearing conditions in the case of analog transmission.

Figure 10:
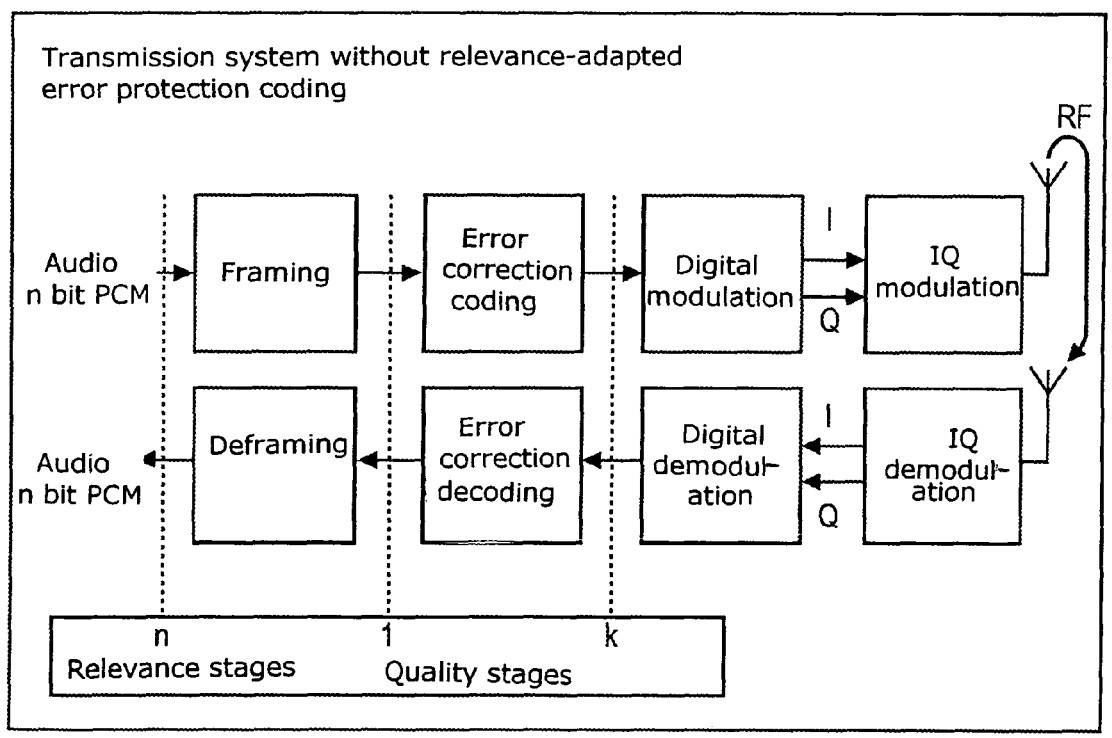
FIG. 10 illustrates, in block diagram form, a structural diagram for a transmission system without relevance-adapted error protection coding.
Figure 11:
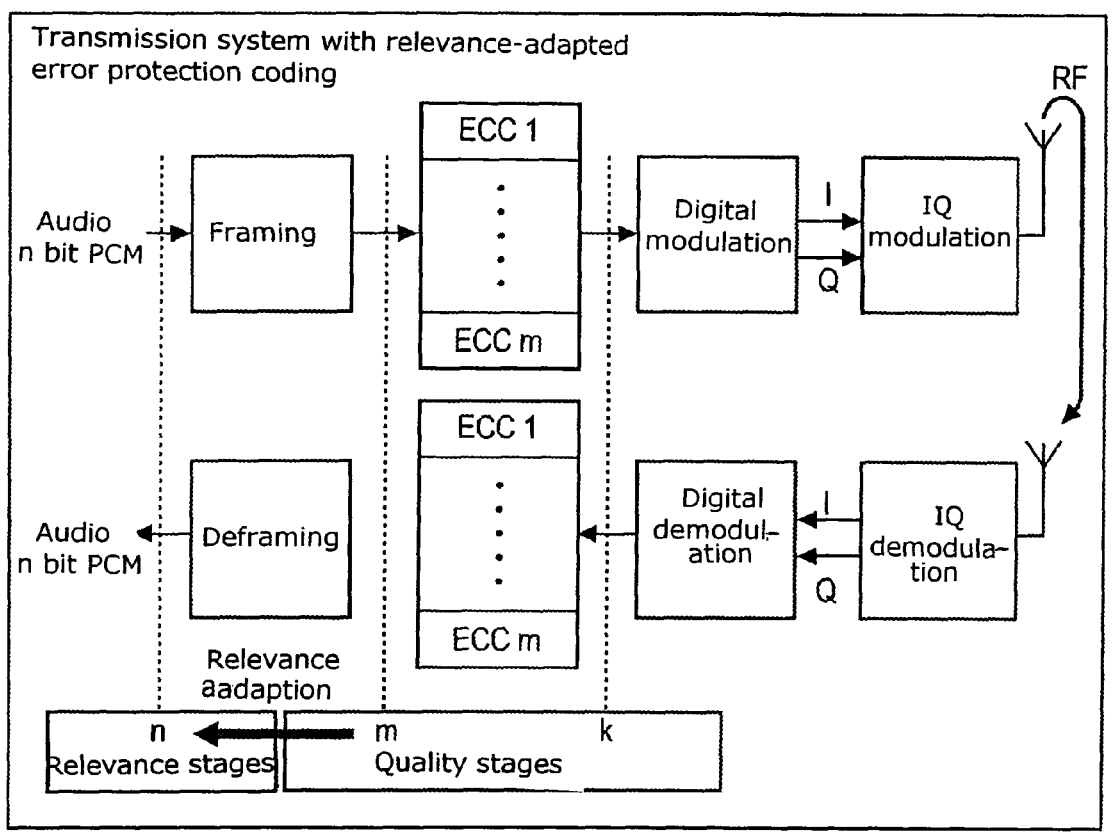
FIG. 11 shows a structural diagram, in block form, for a transmission system with relevance-adapted error protection coding.

The various options can be set forth by reference to some further examples:

FIG. 10 shows a structural diagram for a transmission system without relevance-adapted error protection coding; and FIG. 11 shows a structural diagram for a transmission system with relevance-adapted error protection coding.

Prerequisites for the Process:
- after digital demodulation there are more than k=1 quality stages, for which reason a high-grade digital modulation process with at least three bits per symbol is necessary as otherwise different quality stages in the uncoded data are not to be expected (k=1),
- the data to be transmitted contain more than n=1 relevance stages, for which reason the process can be applied for example to PCM coded audio data,
- of the k quality stages present a plurality can be combined to afford the desired number m, for which reason the following applies: m≦k, and
- of the n relevance stages present a plurality can be combined to afford the desired number m, for which reason the following applies: m≦n.

The foregoing description of relevance-adapted error protection coding as shown in FIG. 11, besides the described advantages, suffers from disadvantages in particular in regard to implementation complication and expenditure as a plurality of coders and decoders must be operated in parallel relationship. That requires on the one hand an increased level of hardware complication and expenditure in comparison with simple coding, while on the other hand under some circumstances the delay in the data also increases. More specifically many decoders operate with a fixed delay (calculated in bits). If now the overall data rate is divided up to a plurality of parallel data streams, the data rate per decoder falls and the overall delay (measured in time) rises. In that situation the overall delay is determined by the decoder with the lowest data rate.

A numerical example may illustrate this:

If the decoder delay is at 400 bits and the overall data rate is at 1 Mbit/s, the delay in the case of a decoder of $t_{decoder}$ is at 400 bit/1 Mbit/s, that is to say 400 μs.

If the data rate in the first decoder is at 0.4 Mbit/s and the data rate in the decoder 2 is at 0.6 Mbit/s (0.4 Mbit/s+0.6 Mbit/s=1 Mbit/s, that gives a delay at two decoders of:

$$t_{decoder} = \max(t_{decoder1}; t_{decoder2}) =$$

$$\max\left(\frac{400 \text{ bit}}{0.4 \frac{\text{Mbit}}{\text{s}}}; \frac{400 \text{ bit}}{0.6 \frac{\text{Mbit}}{\text{s}}}\right) = \max(1 \text{ ms}; 0.\overline{6} \text{ ms})$$

and in accordance with the foregoing description that signifies a delay of 1 ms because the decoder with the lowest data rate determines the overall delay.

A way of resolving that problem in accordance with the invention while at the same time involving relevance-adapted coding lies in the use of a folding code with subsequent 'variable puncturing'. In that case the various quality stages are no longer divided into parallel data streams but processed by a respective common coder or decoder of high quality (and due to the higher data rate thus also rapidly). Puncturing is subsequently effected in order to reduce the redundancy to the desired degree again.

In contrast to the process known in the state of the art that puncturing however is not effected constantly but variably and in adapted relationship with the data to be processed. That puncturing is correspondingly reversed again in the receiver and then decoding can take place in a common decoder. In that situation the delay remains as short as possible.

Figure 12:
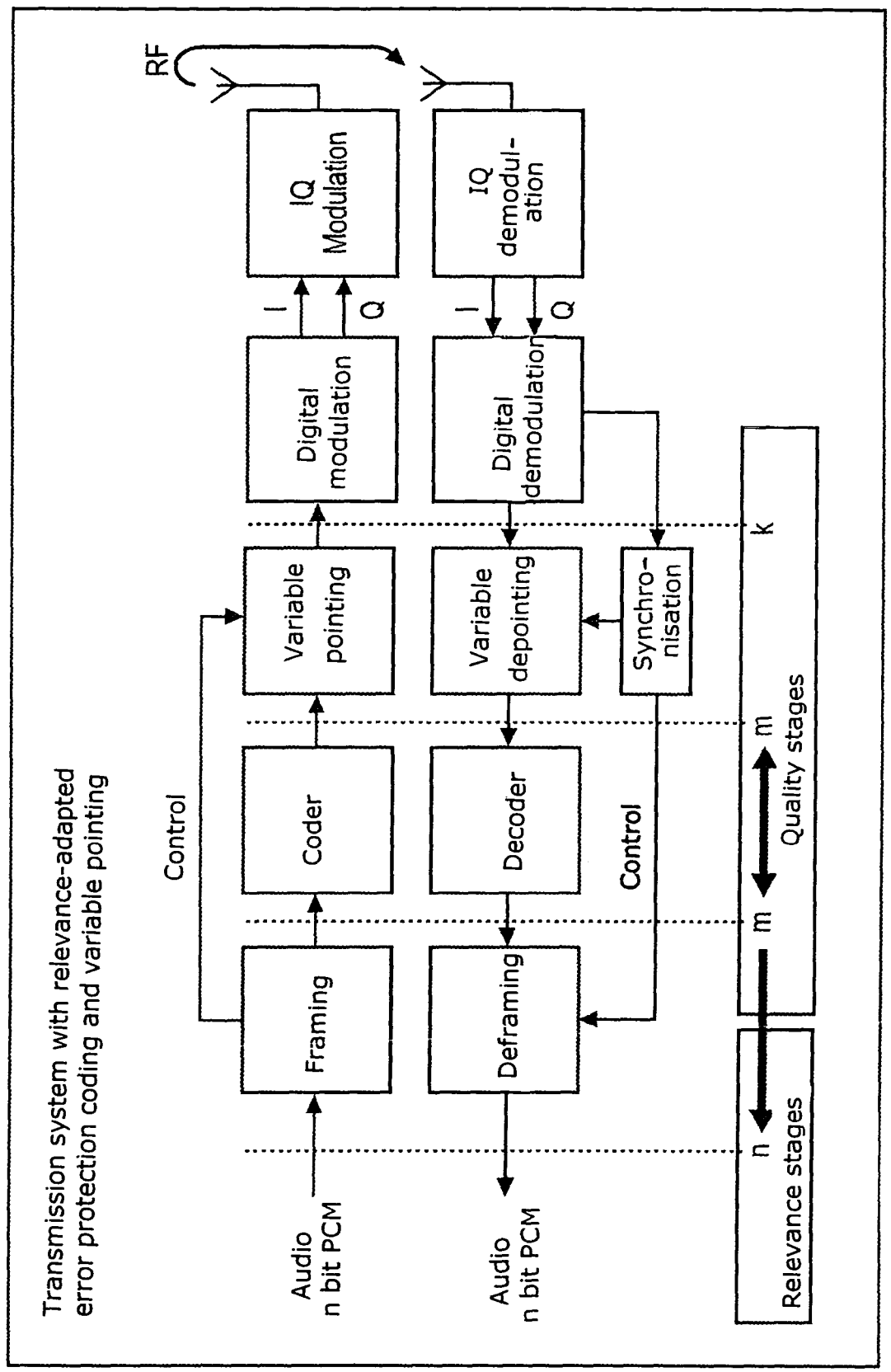
FIG. 12 illustrates a transmission system, in block form, with relevance-adapted error protection and variable puncturing.

That is also clearly illustrated by the diagram shown in FIG. 12.

In this connection attention is to be directed to the state of the art disclosed in WO 03/069918, U.S. Pat. No. 6,170,073, EP 0 798 888 and U.S. Pat. No. 5,751,739. To sum up it can be said that the above-indicated state of the art admittedly discloses overall an unequal error protection, but does not propose adaptation to high-value modulation processes. In contrast thereto, in the case of the process according to the invention, parallel unequal coding is also used to acquire the quality stage and the modulation symbol. Unequal error protection is generally used in the above-indicated documents from the state of the art in order to produce several on a channel with one quality stage, while in the case of the invention it serves to preserve the stages.

Alternatively to or additionally to the relevance-adapted bit mapping, an artificial noise signal can be added to the analog signal in dependence on the residual error rate or other quality criteria, in order to mask residual errors. The usual aural impression of analog transmission is further enhanced in that way.

Error concealment and/or addition of noise can be used independently of each other at different outputs of the receiver. In that way for example the production path and a listening-in path can be treated to differing degrees by means of different processes and/or with different parameters.

If necessary an item of additional information can be added to given outputs, which signals an acoustic reference to given operating conditions to the user or monitoring personnel. Thus for example a buzzing noise can be mixed in at the limit of the range, to signal impending breakdown in the connection. Signalling can be effected by the most widely varying tones or tone sequences but also in plain text.

The present inventions and in particular the described transmission process can be particularly preferably used not only for microphones but also in the opposite transmission direction, that is to say for loudspeaker systems, headphone systems and in particular for in-ear monitor systems. In particular when the described wireless transmission process is used for headphones or earphones of any kind and stereo transmission is necessary, a slight level of audio data compression is used at the analog input of the transmission system, and that compression is then correspondingly decompressed at the receiver end.

If the individual aspects of the invention have already been described in a highly specific context in the present application, the individual aspects of the invention will also be set forth in more general form hereinafter. It is to be emphasised once again at this juncture that the individual aspects of the invention can already in themselves represent an independent invention and not just in conjunction with the whole of the further disclosure, even if combined consideration of all features is an extremely advantageous configuration in order to provide a digital microphone which is adequate in terms of quality requirements and which is still viable in terms of complication and expenditure.

Figure 13:
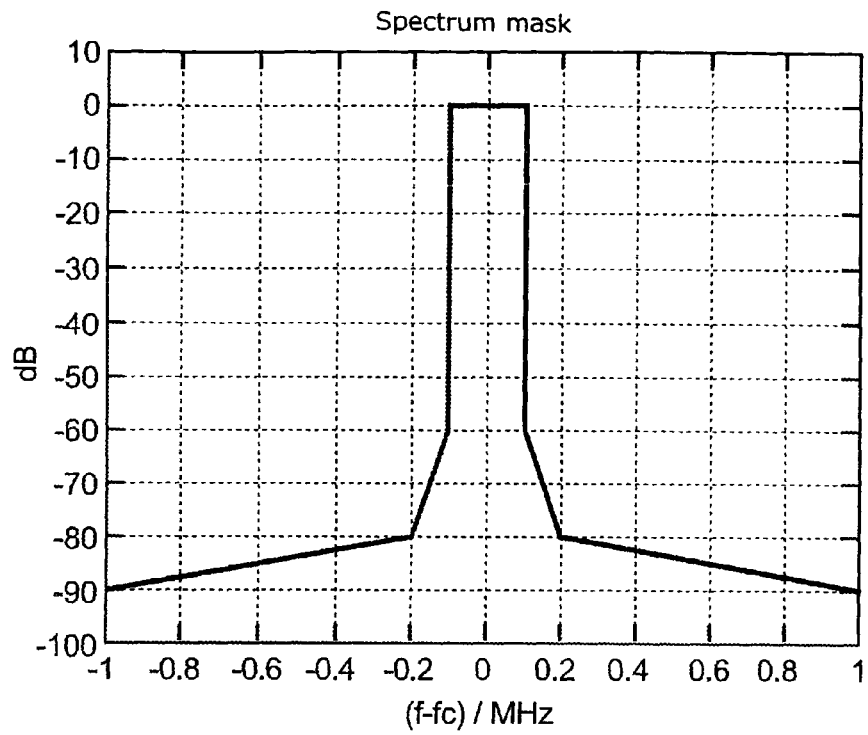
FIG. 13 shows a graphical representation of a spectrum mask with a 200 kHz useful bandwidth.

In FIG. 13, the basis adopted is the illustrated spectrum mask with a 200 kHz useful bandwidth.

Based on the available bandwidth (BW), that affords the symbol rate ($f_{sym}$) in accordance with the following formula:

$$BW = (1+\alpha) \cdot f_{sym} \quad (1)$$

A meaningful range of parameters can be specified in that respect as follows: BW≦200 kHz, a pulse shaping rolloff factor α: 0.1≦α≦0.5 and a symbol rate in the range between 130 kHz and 185 kHz.

A specific example of values in that respect would be a bandwidth BW of 200 kHz, an α of 0.3 and an $f_{sym}$ of 150 kHz.

By virtue of a high-value modulation process with M bit per symbol (with a symbol supply of $2^M$) there follows for the coded bit rate ($f_{coded}$) in accordance with the formula:

$$BW = (1+\alpha) \cdot \frac{1}{M} \cdot f_{coded} \quad (2)$$

An appropriate parameter range is specified by M≧1 bit and ≦8 bits, a symbol supply of $2^M$≧2 and ≦256 and a coded bit rate ('gross') of $f_{coded}$≧130 kbit/s and ≦1.48 Mbit/s.

A specific example of values can be specified by M=4 bits (for example QAM-16), $2^M$=16 and $f_{coded}$=600 kbit/s.

With a code rate C which is defined by the quotients of $C_{in}$ and $C_{out}$ the uncoded bit rate $f_{uncoded}$ follows therefrom in accordance with the following formulae:

$$BW = (1+\alpha) \cdot \frac{1}{M} \cdot \frac{1}{C} \cdot f_{uncoded} \quad (3)$$

and $$BW = (1+\alpha) \cdot \frac{1}{M} \cdot \frac{C_{out}}{C_{in}} \cdot f_{uncoded} \quad (4)$$

An appropriate parameter range for the code rate is here ≧½ and ≦1 and for an uncoded bit rate ('nett')≧65 kbit/s and ≦1.48 Mbit/s. An excellent parameter example for C in that case is at ¾, that is to say 0.75 and for $f_{uncoded}$ at 450 kbit/s.

Finally for adroit puncturing synchronisation it is possible to describe a factor between the code output length $C_{out}$ and the modulation value M, in accordance with the following formulae:

$$\frac{C_{out}}{M} = k \quad (5)$$

$$BW = (1+\alpha) \cdot \frac{C_{out}}{M} \cdot \frac{1}{C_{in}} \cdot f_{uncoded} \quad (6)$$

An appropriate parameter range for k (synchronisation coupling) is in that respect as follows:

$$k = \left\{ \frac{1}{n}; \ldots ; \frac{1}{2}; 1; 2; \ldots ; n \right\}, n \in N^* \quad (7)$$

A specific example of values for $k=C_{out}/M$ can be specified at 4/4, that is to say 1.

By way of the data structuring used that affords an audio data rate $f_{Audio}$ and in that respect in accordance with the above-indicated formula BW is represented as follows:

$$BW = (1+\alpha) \cdot \frac{C_{out}}{M} \cdot \frac{1}{C_{in}} \cdot FR \cdot f_{Audio} \quad (8)$$

In that respect an appropriate parameter range for the frame rate FR is $\geq 1$ and $\leq 1.5$ and the audio data rate $f_{Audio}$ should usually be $\geq 43$ kbit/s and $\leq 1.48$ Mbit/s. A specific numerical example can be specified for FR at 1.125 and $f_{Audio}$ at 400 kbit/s.

On the further assumption of PCM coding of the audio data, there hereby follows an audio sampling rate $f_s$, which is already involved in the above-indicated formula for bandwidth, as follows:

$$BW = (1+\alpha) \cdot \frac{C_{out}}{M} \cdot \frac{1}{C_{in}} \cdot FR \cdot N \cdot f_s \quad (9)$$

An appropriate parameter range for PCM resolution N is in this case $\geq 12$ and $\leq 24$ and for the audio sampling rate $\geq 1.8$ kHz and $\leq 124$ kHz. A specific numerical example can be specified for N=16 and $f_s$=25 kHz.

The necessary bandwidth efficiency in that respect is in accordance with the following formula:

$$Eff_{BW} = \frac{BW}{f_{coded}} = \frac{(1+\alpha)}{M} \frac{Hz}{\frac{bit}{s}} \quad (10)$$

so that with the above-specified parameter ranges for $\alpha$ and M, there is a bandwidth efficiency of $\geq 0.1375$ Hz/bit/s and $\leq 1.5$ Hz/bit/s.

On the assumption of a value for $\alpha=0.\overline{3}$ and M=4, that gives a bandwidth efficiency as follows:

$$Eff_{BW} = 0,\overline{3} \frac{Hz}{\frac{bit}{s}} \quad (11)$$

The described digital receiver according to the invention, besides various digital modulation modes, can also demodulate conventional analog modulation such as for example FM (frequency modulation). In that respect any compression or pre-emphasis which has been implemented is reversed at the digital level. The receiver according to the invention is thus fully rearwardly compatible with the various systems which have already become established.

For the purposes of comfortably finding various modulated transmitters and/or free transmission channels, the receiver according to the invention can have a frequency scan function which indicates band occupation to the user graphically and/or also in tabular form. In that respect modulation of the transmitter and further parameters of the specific modulation such as for example the compander used of an FM path can be automatically ascertained and displayed. The result of the scan function can be used to implement proposals for the choice of frequencies for a specific audio transmission system. The system is thereby enabled to implement self-configuring.

Sampling (AD conversion) of a higher reception bandwidth in the receiver than is required in a single transmission path provides that more than one transmitter can be simultaneously received and demodulated due to the following channel selection in the digital mode. For that purpose it is necessary to increase the IF bandwidth in the analog mode and the dynamics of AD conversion.

Separation of the channels is then effected in the digital plane by digital filters or other necessary computing operations. In that respect each channel can have its own parameters, even different modulation or varying preprocessing.

Audio signals of the various channels can be locally mixed in the receiver, in particular in a bodypack receiver. That mixing is controlled by suitable operating means locally in the bodypack or is implemented locally automatically in accordance with predetermined parameters or implemented under remote control by remote operating console (similarly to a mixing desk) by a sound engineer. In the latter case only control signals are transmitted to the bodypack. The above-described processing variants are not limited to a bodypack receiver but also apply in a corresponding manner to stationary receivers.

By virtue of the software-defined functionality of transmitter and receiver the properties of digital transmission can be highly flexibly adapted to the demands of various situations of use (flexibility due to scalability). Thus it can be useful to scale down the audio quality to the benefit of a longer operating time or a greater transmission range in a manner appropriate to the use involved, for example for speech/reporting. On the other hand the audio quality, dynamics and/or sampling rate can be increased if the situation involves bridging over only a short distance and/or a limited operating time is acceptable.

Mono, stereo and double mono audio transmission can also be selected as options for various situations of use.

The digital data stream can be transmitted in encrypted form, for example by means of previously known encryption mechanisms and processes, whereby bugging of the radio path can be effectively prevented. It is only if the transmitter and the receiver have the same key that audio transmission and in particular reception is possible.

Encryption has the advantage that the audio signal of the microphone cannot be easily received by a third party, but only by the receiver which is associated with the microphone and thus even in the case of a presentation on stage, in a television studio or elsewhere it is not possible for somebody to receive the microphone signal in decrypted form and thus make illicit recordings.

In contrast to the previous diversity processes, in the case of the digital receiver according to the invention, it is not only possible to switch over between the individual reception channels, but simultaneous processing of all incoming data streams can take place. As the bits of the data streams are provided with an item of quality information (soft decision), it is possible, for each bit, to freshly decide on the reception branch from which it is selected. The selection algorithm can both act in a switching-over manner and also implement a weighted junction. That means that the most advantageous weighting of the data streams from a plurality of channels is possible and the information content is put to optimum use. The selection algorithm can be supported by further side information such as for example field strength of the antenna signal or the prevailing bit error rate. The algorithm can be executed adaptively or in a switch-over mode in order to tale account of the HF characteristics of the space involved.

A display is selected for the representation of continuous weighting, that display appropriately representing that channel balance for the users. To represent the weighting of two reception channels, preferably a bar which starts from the centre is adopted, which represents the tendency to one channel or the other to the two sides thereof. The receiver according to the invention thus has a diversity weighting display.

A process which is optimised for efficient processing is used to conceal residual errors which have remained. It substantially comprises a number N of fixed filters of a filter depth k. They are optimised for typical audio signals and can be algorithmically very easily implemented. An adaptive filter is adjusted to the filter which is optimum at the time by an adaptation algorithm. That ensures continuous adaptation to the audio signal. By means of the CRC check sum, it is decided whether the adaptive filter is trained at the time or is used for audio sample replacement. It is only if the prediction error at the time is markedly above the mean prediction error and the CRC sum indicates an error that replacement is effected. That threshold or the underlying algorithm can also be adapted. In addition, feedback of the replaced samples is necessary to avoid error propagation.

Figure 14:
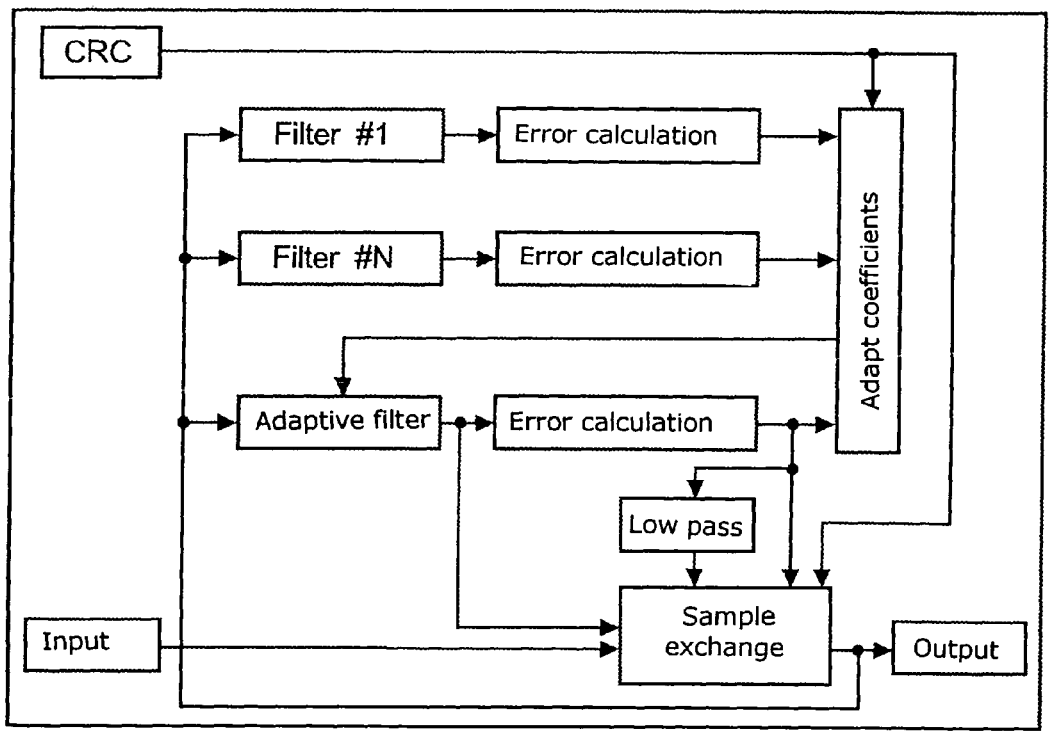
FIG. 14 is a block diagram representation of a post-error concealment process in accordance with the invention.

The post-error concealment just outlined above is shown in FIG. 14.

Digital implementation of microphone transmitters and/or receivers makes it possible in a simple fashion to integrate additional functions which make it possible to set up or check the radio path and further, possibly wired connecting paths for the audio signal. An audio test signal of known amplitude which is generated automatically in the transmitter and/or receiver (for example sine tone, noise etc) makes it possible to check the audio connecting paths and in particular also to correctly set the level for the transmission paths and processing equipment. A modulation signal of known symbol succession which is generated automatically in the transmitter (for example PRBS sequence, sequential sequence of all symbols etc) permits measuring acquisition and testing of the quality of the emitted signal and the radio path.

For a microphone receiver, it is also highly advantageous if it is provided with a filter which can be switched over (plug-gingly interchangeable) at the receiver input. In addition it is also particularly advantageous if the filter is integrated at the receiver input in the receiver antenna, for example it can also be screwed to or attached to the antenna of the receiver. Accordingly the input filter of the receiver is then a unit with the antenna and such an electronically shieldable antenna is particularly advantageous because mounting of the antenna provides that the filter properties of the receiver are also adjustable at the same time.

It is also advantageous if the antenna and the receiver contain devices which enable the receiver to adjust to antenna-specific parameters or to show that the antenna does not suit the desired reception frequency range.

Finally it is also particularly advantageous for a microphone system according to the invention if there are provided means for altering frequency response characteristic or sound characteristic so that, by virtue of a suitable sound design, the microphone can have a desired characteristic, for example the characteristic of a microphone like the famous U87 from Georg Neumann, Berlin, or MD 421 from Sennheiser, and others. Therefore, by way of the frequency response characteristic or sound characteristic altering means, a customer can set a desired characteristic and in particular can also select such a characteristic which is perhaps not optimum in the acoustic sense but is characteristic of a given generation of microphones or a given type of microphone.

The invention overall achieves better frequency economy and the feedback characteristic is also improved.

While the foregoing description and drawings represent the present invention, it will be obvious to those skilled in the art that various changes may be made therein without departing from the true spirit and scope of the present invention.

What is claimed is:

1. A process for transmitting digitized audio data of high quality and with a short delay, the method comprising:
    using a channel filter to shape a high frequency spectrum of the digitized audio data transmission; and
    a step of processing the digitized audio data in blocks, where an audio bandwidth is proportional to a symbol rate;
    wherein the channel filter shapes the high frequency spectrum to have no attenuation in a first frequency range of about 100 to 300 kHz useful bandwidth;
    wherein the channel filter shapes the high frequency spectrum to have a stop-band attenuation of more than 60 dB in a frequency range outside the first frequency range;
    wherein, in a bandwidth of about 150 to 250 kHz:
        the symbol rate is approximately in a range between 130 and 220 kHz; and
        a rolloff factor ($\alpha$) is in a range between 0.1 and 0.5; and
    wherein the bandwidth is calculated in accordance with the formula:

$$BW=(1+\alpha) \cdot f_{sym}.$$

2. The process for transmitting digitized audio data according to claim 1;
    wherein no audio data compression is used in the process.

3. A process for transmitting digitized audio data of high quality and with a short delay, the method comprising:
    using a channel filter to shape a high frequency spectrum of the digitized audio data transmission;
    wherein the channel filter shapes the high frequency spectrum to have no attenuation in a first frequency range of about 100 to 300 kHz useful bandwidth;
    wherein the channel filter shapes the high frequency spectrum to have a stop-band attenuation of more than 60 dB in a frequency range outside the first frequency range;

wherein the digitized audio data are processed in blocks;
wherein a high-grade modulation process is used for the transmission of the digitized audio data;
wherein a plurality of bits are assembled in a modulation symbol and transmitted;
wherein a bandwidth is inversely proportional to a modulation value M;
wherein the bandwidth is also proportional to a, coded bit rate; and
wherein a symbol supply is $2^M$ and is in a range of 1 to 256.

4. The process for transmitting digitized audio data according to claim 1;
wherein at least one of
a bandwidth is inversely proportional to a code rate; and
the bandwidth is proportional to an uncoded bit rate.

5. The process for transmitting digitized audio data according to claim 1;
wherein no audio data compression is used; and
wherein the bandwidth is proportional to a factor k, where k describes a quotient of a code output length ($C_{out}$) and a modulation value M.

6. The process for transmitting digitized audio data according to claim 1;
wherein no audio data compression is used;
wherein the digitized audio data are processed in blocks;
wherein a bandwidth is proportional to an audio data rate; and
wherein the bandwidth is also proportional to a frame rate.

7. The process for transmitting digitized audio data according to claim 1;
wherein no audio data compression is used;
wherein the digitized audio data are processed in blocks;
wherein the digitized audio data are subjected to PCM coding with a PCM resolution N; and
wherein an audio sampling rate $f_s$ is about $\geq 1.8$ kHz and $\leq 124$ kHz.

8. A process for transmitting digitized audio data of high quality and with a short delay, the method comprising:
using a channel filter to shape a high frequency spectrum of the digitized audio data transmission;
wherein the channel filter shapes the high frequency spectrum to have no attenuation in a first frequency range of about 100 to 300 kHz useful bandwidth;
wherein the channel filter shapes the high frequency spectrum to have a stop-band attenuation of more than 60 dB in a frequency range outside the first frequency range;
wherein no digitized audio data compression is used;
wherein the digitized audio data are processed in blocks;
wherein the digitized audio data after coding are subjected to puncturing which is adapted to the data to be processed; and
wherein said puncturing, upon reception of the coded digitized audio data, is correspondingly reversed prior to a decoding operation.

9. A process for transmitting digitized audio data of high quality and with a short delay, the method comprising:
using a channel filter to shape a high frequency spectrum of the digitized audio data transmission;
wherein the channel filter shapes the high frequency spectrum to have no attenuation in a first frequency range of about 100 to 300 kHz useful bandwidth;
wherein the channel filter shapes the high frequency spectrum to have a stop-band attenuation of more than 60 dB in a frequency range outside the first frequency range;
wherein the digitized audio data are disassembled at the transmission end into frames;
wherein each frame is of a frame length of $R_{uncoded}$ bits;
wherein each frame contains an integral number of sampling values of the bit length N,
wherein there are provided E bits for error recognition or error correction, S bits for synchronization, and A bits for other purposes;
wherein each frame is extended by one or more channel coders;
wherein application of an overall code rate C in a range between 0.5 and 1 to a frame length of $R_{coded}=R_{coded}/C$ bits, and/or $R_{coded}$ is an integral multiple of a symbol length M; and
wherein the value for $R_{uncoded}$ is a value in a range between 20 and 500 bits, and the value for $R_{coded}$ is a value in a range between 20 and 100 bits.

10. An apparatus for the transmission of digitized audio data comprising:
a channel filter configured to shaping a high frequency spectrum of the digitized audio data transmission, where the channel filter is used as a transmission path;
wherein the channel filter is configured to shape the high frequency spectrum to have a stop-band attenuation of more than 60 dB at a first frequency range of about 100 to 300 kHz spacing relative to a carrier center;
wherein the digitized audio data is processed in blocks, where an audio bandwidth is proportional to a symbol rate;
wherein, in a bandwidth of about 150 to 250 kHz:
the symbol rate is approximately in a range between 130 and 220 kHz; and
a rolloff factor ($\alpha$) is in a range between 0.1 and 0.5; and
wherein the bandwidth is calculated in accordance with the formula:

$$BW=(1+\alpha) \cdot f_{sym}.$$

11. The process for transmitting digitized audio data according to claim 1;
wherein modulation symbols differ in respect of at least one of amplitude and phase.

12. The process according to claim 1, further comprising:
using a transmitter to transmit the digitized audio data and a receiver to receive the transmitted digitized audio data;
wherein, in the transmitter, functionalities of frame generation, channel coding, and symbol generator, and, in the receiver, functionalities for symbol decoding, channel decoding, and frame disassembling are so designed that they can sort the data to be transmitted in accordance with various relevance stages, starting from the lowest and/or highest relevance stage to the respective higher/lower relevance stage.

13. The process according to claim 12;
wherein the various relevance stages are processed differently and independently of each other.

14. The process according to claim 1;
wherein, in a symbol generator at a transmission end, an association of data of high relevance is effected with a first type of bit positions and an association of data of low relevance is effected with a second type of bit positions, where the first type of bit positions are more secure than the second type of bit positions.

15. The process according to claim 1;
wherein, at a transmission end, a plurality of antennae or antenna segments are used or provided for an emission of a high frequency signal; and
wherein antennae or antenna segments of the plurality of antennae or antenna segments which have a best matching at a given time of emission are used for emission.

16. The process according to claim 1;
wherein a received signal is digitized by an A/D converter device which is operated at a clock of constant frequency;
wherein a sampling rate of the A/D converter device corresponds to a multiple of a baseband Nyquist rate; and
wherein at least one of:
- a true symbol rate is recovered in a separate independent device;
- an actual symbol is calculated in an interpolation circuit; and
- signal processing is effected in asynchronous relationship with the transmission clock and synchronization to the precise transmission clock is effected only at the end of the signal processing chain.

17. The process according to claim 1;
wherein one or more reception paths are provided at a reception end;
wherein symbol decoder auxiliary information are obtained from at least one of symbol distortions and reception field strengths of each reception path; and
wherein incoming information in a channel decoder contains contributions from all reception paths.

18. The process according to claim 1;
wherein an algorithm which does not have any precise information about the error position is used for concealing residual errors.

19. The process according to claim 18;
wherein data from the concealing algorithm are used only when a transmitted data frame is recognized as defective.

20. The process according to claim 1;
wherein a continuous, non-linear first characteristic is used as source coding which comprises at least two segments, where the first segment is linear and the other segments are non-linear.

21. The process according to claim 20;
wherein a second characteristic inverse to the continuous, non-linear first characteristic is used in the associated receiving device.

22. A device for implementing the process according to claim 1, comprising:
an analog input circuit comprising:
  an adjustable input amplifier;
  a limiting device for preventing overdriving;
  a digitization device with a word width K; and
  a computing device for computing a non-linear characteristic;
wherein the non-linear characteristic for positive values comprises at least two segments;
wherein one of the two segments is a segment for low input values which is linear and the other segment is non-linear;
wherein intersection between the segments is so calculated that tangents to the curves coincide when approaching the intersection from both sides;
wherein a characteristic for negative input values is of a symmetrical configuration relative to corresponding positive input values; and
wherein an output word width L of the non-linear characteristic is less than a word width of the digitization device.

23. The device according to claim 22;
wherein the device is configured for at least one of (1) a microphone to be connected to the analog input circuit and (2) analog high-level signals to be connected to the analog input circuit device.

24. The device according to claim 22;
wherein the input circuit includes a change-over switching means in order alternatively to select a digital input.

25. The device according to claim 22;
wherein a gradient of a first segment of the two segments is unequal to 1.

26. The device according to claim 22, further comprising:
a digitization device, in which said limiting circuit is included.

27. The process according to claim 1;
wherein frame length, channel coder, and word width of the modulation symbols are selected in dependence on each other;
wherein the frame length is an integral multiple of a word width of sampling values; and
wherein at least one of:
- the frame length is an integral multiple of an input word width of the channel coder;
- a number of bits per modulation symbol is equal to an output word width of the channel coder; and
- necessary additional data are inserted into a frame with an omission of sampling values.

28. The process according to claim 27;
wherein the number of bits per modulation symbol or an inverse thereof is an integral multiple of the output word width of the channel coder.

29. The process according to claim 28;
wherein a plurality of subframes are combined in a frame.

30. The process according to claim 27
wherein, embedded in the frame, are additional data in the form of at least one of a synchronization pattern and a check sum; and
wherein a sum of the bits of said additional data is an integral multiple of the word width of the sampling values.

31. The process according to claim 1;
wherein comfort noise is mixed with the audio information for error concealment.

32. The process according to claim 1;
wherein an audio signal is outputted at more than one output, where each output is processed with its own concealment algorithm.

33. The process according to claim 1;
wherein an audio signal is outputted at more than one output;
wherein signaling information is individually mixed with each output; and
wherein the signaling information signals given operating conditions, said signaling information being acoustic information.

34. The process according to claim 1;
wherein the digitized audio data is encrypted and then transmitted via a microphone signal; and
wherein the encrypted digitized audio data is decrypted by a corresponding decrypter present in a receiver.

35. A microphone;
wherein the microphone is configured to transmit digitized audio data according to the process of claim 1; and
wherein the microphone is switchable into a test mode in which a defined audio signal is generated at the microphone end and emitted as the transmitted digitized audio data.

36. A microphone receiver;
wherein the microphone receiver is configured to receive digitized audio data according to the process of claim 1; and
wherein the microphone receiver is switchable into a test mode in which a defined generated audio signal is individually made available at outputs of the receiver.

37. A microphone according to claim 35;
wherein the microphone is switchable into a test mode in which, at a microphone end, a defined modulation signal is emitted with known modulation symbols.

38. An apparatus for transmitting digitized audio data of high quality and with a short delay, comprising:
a channel filter which shapes a high frequency spectrum of the digitized audio data transmission;
wherein the channel filter shapes the high frequency spectrum to have no attenuation in a first frequency range of about 100 to 300 kHz useful bandwidth;
wherein the channel filter shapes the high frequency spectrum to have a stop-band attenuation of more than 60 dB in a frequency range outside the first frequency range;
wherein modulation symbols differ in respect of amplitude and/or phase;
wherein the digitized audio data is processed in blocks where an audio bandwidth is proportional to a symbol rate;
wherein in a bandwidth of about 150 to 250 kHz:
the symbol rate is approximately in a range between 130 and 220 kHz; and
a rolloff factor ($\alpha$) is in a range between 0.1 and 0.5; and
wherein the bandwidth is calculated in accordance with the formula:

$$BW=(1+\alpha) \cdot f_{sym}.$$

39. An apparatus for transmitting digitized audio data of high quality and with a short delay, comprising:
a channel filter which shapes a high frequency spectrum of the digitized audio data transmission;
a transmitter which transmits the digitized audio data; and
a receiver which receive the transmitted digitized audio data;
wherein the channel filter shapes the high frequency spectrum to have no attenuation in a first frequency range of about 100 to 300 kHz useful bandwidth;
wherein the channel filter shapes the high frequency spectrum to have a stop-band attenuation of more than 60 dB in a frequency range outside the first frequency range;
wherein, in the transmitter, functionalities of frame generation, channel coding, and symbol generator, and, in the receiver, functionalities for symbol decoding, channel decoding, and frame disassembling are so designed that they can sort the data to be transmitted in accordance with various relevance stages, starting from the lowest and/or highest relevance stage to the respective higher/lower relevance stage;
wherein the digitized audio data is processed in blocks, where an audio bandwidth is proportional to a symbol rate;
wherein, in a bandwidth of about 150 to 250 kHz:
the symbol rate is approximately in a range between 130 and 220 kHz; and
a rolloff factor ($\alpha$) is in a range between 0.1 and 0.5; and
wherein the bandwidth is calculated in accordance with the formula:

$$BW=(1+\alpha) \cdot f_{sym}.$$

40. The apparatus according to claim 39;
wherein the various relevance stages are processed differently and independently of each other.

41. The apparatus according to claim 10;
wherein, in a symbol generator at a transmission end, an association of data of high relevance is effected with a first type of bit positions and an association of data of low relevance is effected with a second type of bit positions, where the first type of bit positions are more secure than the second type of bit positions.

42. The apparatus according to claim 10;
wherein, at a transmission end, a plurality of antennae or antenna segments are used or provided for an emission of a high frequency signal; and
wherein antennae or antenna segments of the plurality of antennae or antenna segments which have a best matching at a given time of emission are used for emission.

43. The apparatus according to claim 10;
wherein a received signal is digitized by an A/D converter device which is operated at a clock of constant frequency;
wherein a sampling rate of the A/D converter device corresponds to a multiple of a baseband Nyquist rate; and
wherein at least one of:
a true symbol rate is recovered in a separate independent device;
an actual symbol is calculated in an interpolation circuit; and
signal processing is effected in asynchronous relationship with the transmission clock and synchronization to the precise transmission clock is effected only at the end of the signal processing chain.

44. The apparatus according to claim 10;
wherein one or more reception paths are provided at a reception end;
wherein symbol decoder items of side information are obtained from at least one of symbol distortions and reception field strengths of each reception path; and
wherein incoming information in a channel decoder contains contributions from all reception paths.

45. The apparatus according to claim 10;
wherein an algorithm which does not have any precise information about the error position is used for concealing residual errors.

46. The apparatus according to claim 45;
wherein data from the concealing algorithm is used only when a transmitted data frame is recognized as defective.

47. The apparatus according to claim 10;
wherein a continuous, non-linear first characteristic is used as source coding which comprises at least two segments, where the first segment is linear and the other segments are non-linear.

48. The apparatus according to claim 47;
wherein a second characteristic inverse to the continuous, non-linear first characteristic is used in the associated receiving device.

49. The apparatus according to claim 10, further comprising:
an analog input circuit comprising:
an adjustable input amplifier;
a limiting device for preventing overdriving;
a digitization device with the word width K and a computing device for computing a non-linear characteristic;
wherein the non-linear characteristic for positive values comprises at least two segments, wherein one of the two segments is a segment for low input values which is linear and the other segment is non-linear;

wherein intersection between the segments is so calculated that tangents to the curves coincide when approaching the intersection from both sides;

wherein a characteristic for negative input values is of a symmetrical configuration relative to corresponding positive input values; and wherein an output word width L of the non-linear characteristic is less than a word width of the digitization device.

50. The apparatus according to claim 49;

wherein the apparatus is configured for at least one of (1) a microphone to be connected to the analog input circuit and (2) analog high-level signals to be connected to the analog input circuit.

51. The apparatus according to claim 49;

wherein the input circuit includes a change-over switching means in order alternatively to select a digital input.

52. The apparatus according to claim 49;

wherein a gradient of a first segment of the two segments is unequal to 1.

53. The apparatus according to claim 49, further comprising:

a digitization device, in which said limiting circuit is included.

54. The apparatus according to claim 10;

wherein frame length, channel coder, and word width of the modulation symbols are selected in dependence on each other;

the frame length is an integral multiple of the word width of the sampling values; and wherein at least one of the frame length is an integral multiple of an input word width of the channel coder;

a number of bits per modulation symbol is equal to an output word width of the channel coder; and necessary additional data are inserted into a frame with an omission of sampling values.

55. The apparatus according to claim 54;

wherein the number of bits per modulation symbol or an inverse thereof is an integral multiple of the output word width of the channel coder.

56. The apparatus according to claim 54;

wherein a plurality of subframes are combined in a frame.

57. The apparatus according to claim 56;

wherein, embedded in the frame, are additional data in the form of at keas tine if a synchronization pattern and a check sum; and wherein a sum of the bits of said additional data is an integral multiple of the word width of the sampling values.

58. The apparatus according to claim 10;

wherein comfort noise is mixed with the audio information for error concealment.

59. The apparatus according to claim 10;

wherein an audio signal is outputted at more than one output, where each output is processed with its own concealment algorithm.

60. The apparatus according to claim 10;

wherein an audio signal is outputted at more than one output;

wherein signaling information is individually mixed with each output; and wherein the signaling information signals given operating conditions, said signaling information being acoustic information.

61. The apparatus according to claim 10;

wherein the digitized audio data is encrypted and then transmitted via a microphone signal; and wherein the encrypted digitized audio date is decrypted by a corresponding decrypter present in the receiver.

62. An apparatus for the transmission of digitized audio data comprising:

a channel filter configured to shaping a high frequency spectrum of the digitized audio data transmission, where the channel filter is used as a transmission path;

wherein the channel filter is configured to shape the high frequency spectrum to have a stop-band attenuation of more than 60 dB at a first frequency range of about 100 to 300 kHz spacing relative to a carrier center;

wherein the digitized audio data are processed in blocks;

wherein a high-grade modulation process is used for the transmission of the digitized audio data;

wherein a plurality of bits are assembled in a modulation symbol and transmitted;

wherein a bandwidth is inversely proportional to a modulation value M;

wherein the bandwidth is also proportional to a coded bit rate; and wherein a symbol supply is $2^M$ and is in a range of 1 to 256.

63. An apparatus for the transmission of digitized audio data comprising:

a channel filter configured to shaping a high frequency spectrum of the digitized audio data transmission, where the channel filter is used as a transmission path;

wherein the channel filter is configured to shape the high frequency spectrum to have a stop-band attenuation of more than 60 dB at a first frequency range of about 100 to 300 kHz spacing relative to a carrier center;

wherein no digitized audio data compression is used;

wherein the digitized audio data are processed in blocks;

wherein the digitized audio data after coding are subjected to puncturing which is adapted to the data to be processed; and wherein said puncturing, upon reception of the coded digitized audio data, is correspondingly reversed prior to a decoding operation.

64. An apparatus for the transmission of digitized audio data comprising:

a channel filter configured to shaping a high frequency spectrum of the digitized audio data transmission, where the channel filter is used as a transmission path;

wherein the channel filter is configured to shape the high frequency spectrum to have a stop-band attenuation of more than 60 dB at a first frequency range of about 100 to 300 kHz spacing relative to a carrier center;

wherein the digitized audio data are disassembled at the transmission end into frames;

wherein each frame is of a frame length of $R_{uncoded}$ bits;

wherein each frame contains an integral number of sampling values of the bit length N, wherein there are provided E bits for error recognition or error correction, S bits for synchronization, and A bits for other purposes;

wherein each frame is extended by one or more channel coders;

wherein application of an overall code rate C in a range between 0.5 and 1 to a frame length of $R_{coded} = R_{coded}/C$ bits, and/or $R_{coded}$ is an integral multiple of a symbol length M; and wherein the value for $R_{uncoded}$ is a value in a range between 20 and 500 bits, and the value for $R_{coded}$ is a value in a range between 20 and 100 bits.

* * * * *